(12) United States Patent
Saini et al.

(10) Patent No.: US 11,023,577 B2
(45) Date of Patent: Jun. 1, 2021

(54) ANOMALY DETECTION FOR TIME SERIES DATA HAVING ARBITRARY SEASONALITY

(71) Applicant: ADOBE INC., San Jose, CA (US)

(72) Inventors: Shiv Kumar Saini, Rajasthan (IN); Natwar Modani, Bengaluru (IN); Balaji Vasan Srinivasan, Bangalore (IN)

(73) Assignee: ADOBE Inc., San Jose, CA (US)

( * ) Notice: Subject to any disclaimer, the term of this patent is extended or adjusted under 35 U.S.C. 154(b) by 716 days.

(21) Appl. No.: 15/228,570

(22) Filed: Aug. 4, 2016

(65) Prior Publication Data
US 2018/0039898 A1  Feb. 8, 2018

(51) Int. Cl.
*G06N 20/00* (2019.01)
*G06F 21/55* (2013.01)
*G06F 11/34* (2006.01)

(52) U.S. Cl.
CPC ........ *G06F 21/554* (2013.01); *G06F 11/3447* (2013.01); *G06N 20/00* (2019.01)

(58) Field of Classification Search
CPC ................................ G06N 20/00; G06F 11/00
See application file for complete search history.

(56) References Cited

U.S. PATENT DOCUMENTS

| | | | |
|---|---|---|---|
| 9,197,511 B2 | 11/2015 | Mathis | |
| 10,003,560 B1* | 6/2018 | Perkins | H04L 51/32 |
| 2009/0017758 A1* | 1/2009 | Dorneich | G06K 9/00523 |
| | | | 455/62 |
| 2009/0018798 A1* | 1/2009 | Dorneich | G06F 17/18 |
| | | | 702/179 |
| 2014/0019397 A1* | 1/2014 | Alexander | H04W 4/029 |
| | | | 706/46 |
| 2015/0185069 A1* | 7/2015 | Meerpohl | G01H 3/08 |
| | | | 702/56 |
| 2016/0210556 A1* | 7/2016 | Ben Simhon | G06F 11/07 |
| 2017/0249376 A1* | 8/2017 | Garvey | G06Q 30/0201 |
| 2018/0365090 A1* | 12/2018 | Ben Simhon | G06F 11/076 |

OTHER PUBLICATIONS

Kejariwal, "Introducing practical and robust anomaly detection in a time series" published Jan. 6, 2015, Twitter, https://blog.twitter.com/2015/introducing-practical-and-robust-anomaly-detection-in-a-time-series, 5 pages.
Butterworth, "On the Theory of Filter Amplifiers" published Oct. 1930, Admiralty Research Laboratory, Experimental Wireless & The Wireless Engineer, pp. 536-541.

* cited by examiner

Primary Examiner — Kamran Afshar
Assistant Examiner — Urmama Islam
(74) *Attorney, Agent, or Firm* — Shook, Hardy & Bacon L.L.P.

(57) ABSTRACT

In various implementations, a method includes receiving a set of time series data that corresponds to a metric. A seasonal pattern is extracted from the set of time series data and the extracted seasonal pattern is filtered from the set of time series data. A predictive model is generated from the filtered set of data. The extracted seasonal pattern is filtered from another set of time series data where the second set of time series data corresponds to the metric. The filtered second set of time series data is compared to the predictive model. An alert is generated to a user for a value within the filtered second set of time series data which falls outside of the predictive model.

20 Claims, 9 Drawing Sheets

ANOMALY DETECTION FOR TIME SERIES DATA HAVING ARBITRARY SEASONALITY

BACKGROUND

Anomaly detection systems alert users when values of metrics captured from time series data (e.g. page views, page load time, etc.) fall outside of expected ranges. Anomaly detection systems can effectively identify anomalies by taking into account seasonal patterns (e.g., seasonal periods), or regular periodic variations in metrics which could otherwise appear anomalous. To do so, conventional systems estimate parameters based on historic values of metrics. These parameters are used to predict future values of metrics, which are then used as reference points for anomaly detection. Typical predictive models predict a single value for each 24 hour period, meaning they have daily granularity. This low granularity contributes to a delay between the receiving of metric data indicating anomalies and the generating and providing of alerts to users. However, increasing granularity rapidly increases the number of parameters that must be estimated in these approaches. Therefore, predictive models with high granularity (e.g. hourly) are untenable due to processing and storage requirements of the parameters.

In order for conventional systems to account for the seasonal patterns discussed above, a user is required to manually specify the seasonal period. As such, if the user is incorrect, the seasonal component of the time series data will be incorrectly modeled, which significantly decreases the accuracy of the anomaly detection. For instance, the user may lack prior knowledge regarding the seasonality of the time series data, which prevents the user from ensuring the seasonal period they provide is accurate. Further, some time series data may include multiple prominent seasonalities (e.g. both daily and weekly seasonal patterns). Conventional Anomaly detection systems only account for a single, seasonal pattern, which can further decrease the accuracy of alert generation.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Aspects of the present disclosure relate to an anomaly detection technology that can improve detection of anomalies within time series data. The disclosed anomaly detection technology can accurately track time series data with any granularity, regardless of the number of seasonal patterns in the data, and without requiring a large number of parameters. In some respects, the disclosed anomaly detection technology analyzes historic time series data and decomposes the data to extract seasonal patterns therefrom. The technology can automatically determine the prominent seasonal patterns and select a seasonal pattern therefrom to set a seasonal period for a predictive model. Thus, users need not specify the seasonality in the time series data.

In further respects, the disclosed anomaly detection technology filters contributions of prominent seasonal patterns from the historic time series data used to train a predictive model. Doing so allows the predictive model to estimate fewer parameters that are more accurate due to the historic time series data being simplified. The technology can use the trained predictive model to analyze new time series data and generate at least one alert when at least one value falls outside of expected ranges predicted by the predictive model. In doing so, the technology may filter the new time series data similar to the historic time series data used to train the predictive model. In some cases, the technology retrains the predictive model after analyzing the time series data for anomalies by adjusting parameters of the model to account for the new time series data.

BRIEF DESCRIPTION OF THE DRAWING

The present invention is described in detail below with reference to the attached drawing figures, wherein.

DETAILED DESCRIPTION

Figure 1:
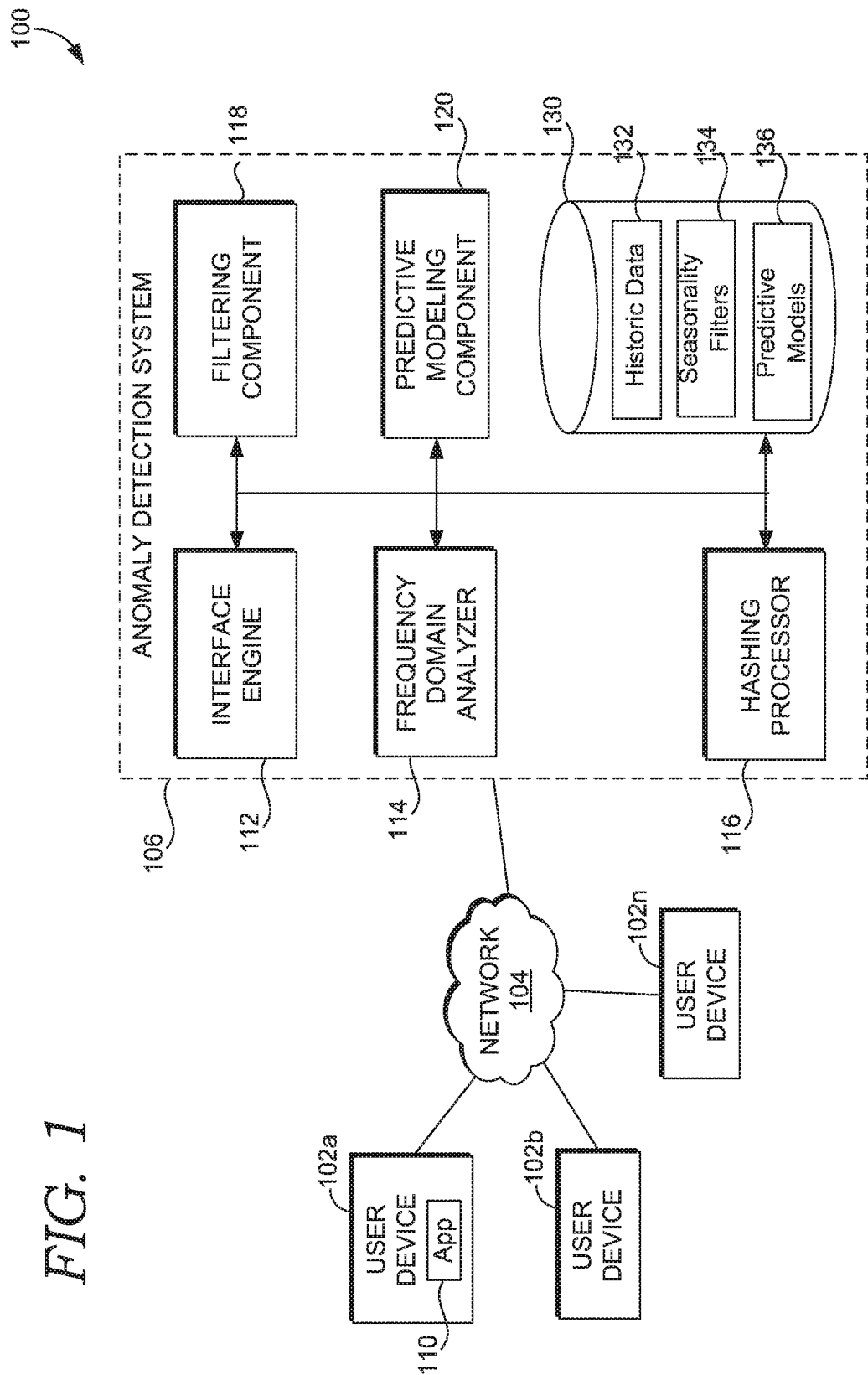
FIG. 1 shows a block diagram showing an example of an operating environment in accordance with embodiments of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the present disclosure relate to an anomaly detection technology that can improve detection of anomalies within time series data. Conventional anomaly detection systems predict the future expected range of a metric by analyzing historic time series data. The technology flags a metric measured outside of the expected range as an anomaly and triggers an alert to a user. It is therefore important that the expected range is accurate so that a computer can appropriately triggers alerts to a user.

Typically, anomaly detection systems use statistical analysis of historic time series data to determine expected values for each time interval (e.g. each hour, day, etc.

depending on the model) in the historic time series data as a function of time. This enables the systems to produce a model for what values can be expected in the future. In order for these systems to function properly, a seasonal period must be established which accurately samples any seasonality exhibited by the time series data. Seasonality, as the term is used here, is a characteristic of time series data in which the data experiences regular and predictable changes which recur over a seasonal period (e.g. daily, weekly, annually, etc.). Any predictable change or pattern in time series data that recurs or repeats over a regular period can be said to be seasonal. However, conventional anomaly detection systems require a user to anticipate what seasonality the time series data is likely to exhibit and provide the seasonal period to the system. Thus, if the user-provided seasonal period is inaccurate, the models are unable to accurately predict future values of the metric.

Furthermore, the complexity of predictive models generated when utilizing time series data of higher granularity presents a challenge due to required computer resources. Using conventional approaches, the number of parameters required to be estimated greatly increases when predictive modeling techniques designed for data having daily granularity are extended for hourly data. For example, a typical predictive model with daily granularity and a seasonal period of one week may only require 9 parameters to be estimated, but generating a model in the same way for data with hourly granularity may require 170 parameters to be estimated. The increased processing time and computing resources required to generate, execute, and update more complex models increases latency and can make such models unsuitable for particular applications, such as tracking and alerting in real-time or near real-time metrics or web-hosted applications.

A further challenge arises when the time series data exhibits more than one seasonal period. For example, values of a metric in time series data can exhibit a daily variation as well as an overall weekly variation. In these cases, the computing system may be unable to accurately account for a longer seasonal period. A naïve approach that simply ignores these patterns when generating a predictive model and assumes that they are part of the natural variation in the data results in a model that improperly factors these longer seasonal variations into the uncertainty in the expected value. This can result in less accurate predictions and increases the likelihood of cases where anomalies fail to trigger alerts.

Thus, as described above, conventional approaches often are unable to accurately and efficiently predict values for metrics having higher granularity. This results in a computer being unable to properly alert users on anomalies in metrics. This might lead, for example, to web performance anomalies going unnoticed, and therefore unaddressed, by the user. Alternatively, efforts to produce more accurate models from conventional approaches generate models with far more parameters, which must be estimated and stored. Though this technique can produce a more robust model that can address time series data having more complex seasonal patterns, it also can result in a large degree of redundancy when the time series data has a simple seasonal pattern. In such cases, the additional computing power and resources required to generate, execute, and update these more complicated models may be essentially wasted.

The present disclosure provides various analytic and filtering systems that a computer can use to simplify time series data prior to generating a predictive model used for anomaly detection. The system can first filter received measurements of metrics using the seasonality filter to generate a set of filtered measurements. The system can tune the seasonality filter to remove variations in the time series data which correspond to a specified seasonal pattern. The system can then compare the filtered measurements to the expected values for the metrics. If the filtered measurements are found to fall outside of the expected range of the predictive model, the system can trigger an alert to a user that an anomaly has been detected. These analytic and filtering systems enhance the efficiency, accuracy and simplicity of predictive models generated by anomaly detection systems in such complex cases as when time series data exhibits multiple seasonal patterns, and when the metrics have higher levels of granularity (e.g. hourly).

In some implementations, the technology first extracts repeating seasonal patterns from the time series data in order to determine which pattern should be targeted by the seasonality filter. In some cases, the technology analyzes and decomposes historic time series data to extract repeating seasonal patterns. In doing so, variation in the time series data is represented as a combined contribution of various frequencies. The technology converts the historic time series data from its original time domain to a representation in the frequency domain, with each frequency having an amplitude. The amplitude of each frequency correlates to the amount that frequency contributes to the variation in the time series data. That is to say that seasonal patterns which feature prominently in the time series data will correspond to frequencies with large amplitudes. In some embodiments, a hashing processor aggregates and maps the contributions of neighboring frequencies in the frequency domain to a frequency corresponding to the nearest whole number time interval periods (e.g. the nearest hour). The technology can rank the amplitudes of frequencies, with the prominent frequencies either being used by the anomaly detection system to establish the seasonal period for training the predictive model or being filtered out of the time series data prior to training the predictive model. When prominent frequencies are to be filtered out, the technology can generate filters and applied to time series data to remove or dampen the contributions of the prominent frequencies. This effectively results in the variations associated with the filtered frequencies being flattened out in the filtered time series data. The resulting filtered time series data therefore exhibits less complex seasonality due to the variations being flattened out. Therefore, by removing or dampening the contributions of the prominent frequencies, a less complex predictive models can be generated that require fewer parameters to be calculated.

In some implementations, a frequency domain analyzer uses a form of Fourier analysis of time series data to extract a periodogram representing the frequency domain of the time series data. As indicated above, conventional approaches to anomaly detection require the seasonal period over which a pattern is expected to repeat to be specified by a user. In general, the seasonality actually present in the data may have seasonal periods of any duration and may not correspond to the seasonal period specified by the user. Seasonal patterns longer than the specified seasonal period will not complete a full cycle within the specified seasonal period and are not fully represented in the specified seasonal period. Other shorter seasonal patterns may not be well-contained within the specified seasonal period, in that even though they may complete a full cycle within the specified seasonal period, they then go on to complete an additional partial cycle. Seasonal patterns which are longer than the specified seasonal period or which are not well-contained within the seasonal period are problematic, as they are typically poorly modelled using only conventional approaches. The filtering approach disclosed here allows these problematic seasonal periods to be removed from the time series data prior to generating a predictive model. By analyzing the frequency domain of the time series data and filtering higher prominent seasonal patterns out of the time series data prior to training the predictive model, the technology can generates models with relatively few parameter which accurately predict expected ranges for metrics even when the time series data exhibits longer seasonal patterns.

In this regard, an analytic system can first extract a frequency domain representation of the historic time series data in order to automatically identify seasonal patterns in the time series data. A hashing processor can then hash the frequencies associated with these pattern to aggregate frequencies that do not correspond to periods of whole number time intervals and map them to the nearest time interval period. For example, the hashing processor can combine and map frequencies corresponding to a 1.8 hour seasonal period, a 2.0 hour seasonal period, and a 2.3 hour seasonal period all to the 2.0 hour period. The technology can then rank the hashed frequencies according to their signal strength to determine the prominent seasonal patterns. The technology can then isolate these prominent seasonal patterns from the time series data using a seasonality filter tuned to the prominent seasonal pattern, which can be generated from various types of filters, such as a Butterworth filter, a band-pass or band-stop filter, and removed. In another approach, the analytic system can provide a prominent seasonal pattern, so identified, to the anomaly detection system to be used as the seasonal period in training the predictive model. The disclosed anomaly detection technology can then train a predictive model based on the filtered historic time series data to establish expected ranges for metrics of interest within filtered time series data.

Turning now to FIG. 1, a block diagram is provided showing an example of an operating environment in which some implementations of the present disclosure can be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, operating environment 100 includes a number of user devices, such as user devices 102a and 102b through 102n, network 104, and anomaly detection system 106.

It should be understood that operating environment 100 shown in FIG. 1 is an example of one suitable operating environment. Each of the components shown in FIG. 1 may be implemented via any type of computing device, such as one or more of computing device 700, described in connection to FIG. 7, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks, such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and data sources may be employed within operating environment 100 within the scope of the present disclosure. Each may comprise a single device or multiple devices cooperating in a distributed environment. For instance, anomaly detection system 106 may be provided via multiple devices arranged in a distributed environment that collectively provide the functionality described herein. Additionally, other components not shown may also be included within the distributed environment. In some cases, anomaly detection system 106 can be integrated, at least partially, into a user device, such as user device 102a. Furthermore, anomaly detection system 106 may at least partially be a cloud computing service.

User devices 102a through 102n can be client devices on a client-side of operating environment 100, while anomaly detection system 106 can be on a server-side of operating environment 100. Anomaly detection system 106 can comprise server-side software designed to work in conjunction with client-side software on user devices 102a through 102n so as to implement any combination of the features and functionalities discussed in the present disclosure. An example of such client-side software is application 110 on user device 102a. Each other device can include a similar application, with similar functionality. This division of operating environment 100 is provided to illustrate one example of a suitable environment, and it is noted there is no requirement for each implementation that any combination of anomaly detection system 106 and user devices 102a through 102n to remain as separate entities.

User devices 102a through 102n comprise any type of computing device capable of being operated by a user. For example, in some implementations, user devices 102a through 102n are the type of computing devices described in relation to FIG. 7 herein. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1. Application 110 is referred to as a single application for simplicity, but its functionality can be embodied by one or more applications in practice. As indicated above, the other user devices can include one or more applications similar to application 110.

The application(s) may generally be any application capable of facilitating the exchange of information between the user device and the anomaly detection system in carrying out anomaly detection involving at least a user of the user device. In some implementations, the application(s) comprises a web application, which can run in a web browser, and could be hosted at least partially server-side. In addition, or instead, the application(s) can comprise a dedicated application, such as an application having personal assistant functionality. In some cases, the application is integrated into the operating system (e.g., as a service). It is therefore contemplated herein that "application" be interpreted broadly.

Anomaly detection system 106 includes one or more processors, and one or more computer-readable media. The computer-readable medial includes computer-readable instructions executable by the one or more processors. The instructions may implement one or more of interface engine 112, frequency domain analyzer 114, hashing processor 116, filtering component 118, and predictive modeling component 120 shown in FIG. 1.

Storage 130 can comprise the computer-readable medial and is configured to store computer instructions (e.g., software program instructions, routines, or services), data, and/or models used in embodiments described herein. In some implementations, storage 130 stores information or data received via the various components of anomaly detection system 106 and provides the various components with access to that information or data, as needed. In implementations, storage 130 comprises a data store (or computer data memory). Although depicted as a single component, storage 130 may be embodied as one or more data stores and may be in the cloud. Further, the information in storage 130 may be distributed in any suitable manner across one or more data stores for storage (which may be hosted externally).

Interface engine 112 is configured to interface anomaly detection system 106 with user devices, such as user devices 102a and 102b through 102n, for example, over network 104. Interface engine 112 can receive one or more network communication from user devices (e.g., from application 110), and provide one or more network communications to the user devices (e.g., to application 110). Interface engine 112 can communicate with one or more user devices, as needed, to carry out various implementations of the present disclosure.

Interface engine 112 can be configured to receive metrics. As used herein, a metric can refer to a measure of activities or performance. Network-site metrics measure the activities and/or performance of a computer network-site, for example, a web-site. Time series data of network-site metrics measure the activities and/or performance of a computer network-site over time. With regard to time series data, granularity describes the time interval over which data metrics are measured. For example, over a week, a metric having daily granularity would generate seven data points, while 168 different data points would be generated in the same time for this metric at an hourly granularity. In some implementations, interface engine 112 can be configured to receive a stream of time series data. In such cases, interface engine 112 can continuously receive the metrics as well as communicate the metrics and other data between the various components of the system and the user.

Metrics can be stored in storage 130 by anomaly detection systems 106 as historic time series data 132. In some cases, the historic time series data is received into anomaly detection system from devices (e.g., user device 120a or another device associated with a user) through interface engine 112 and the historic time series data includes metrics of interest to the user.

Frequency domain analyzer 114 can be configured to extract periodic patterns from time series data. Frequency domain analyzer 114 can use various analytical methods in order to produce a spectral density estimation of the time series data. For example, frequency domain analyzer 114 may generate a periodogram, given by the modulus square of a discrete Fourier transform as generated by an algorithm, such as a fast Fourier transform (FFT). As the term is used here, a periodogram can refer to an estimate of the power spectral density of time series data which can be used to characterize the seasonality of the time series data. A periodogram or other similar spectral density estimation techniques, can be used to identify individual frequencies which contribute to the periodic patterns exhibited by the time series data.

Figure 2A:
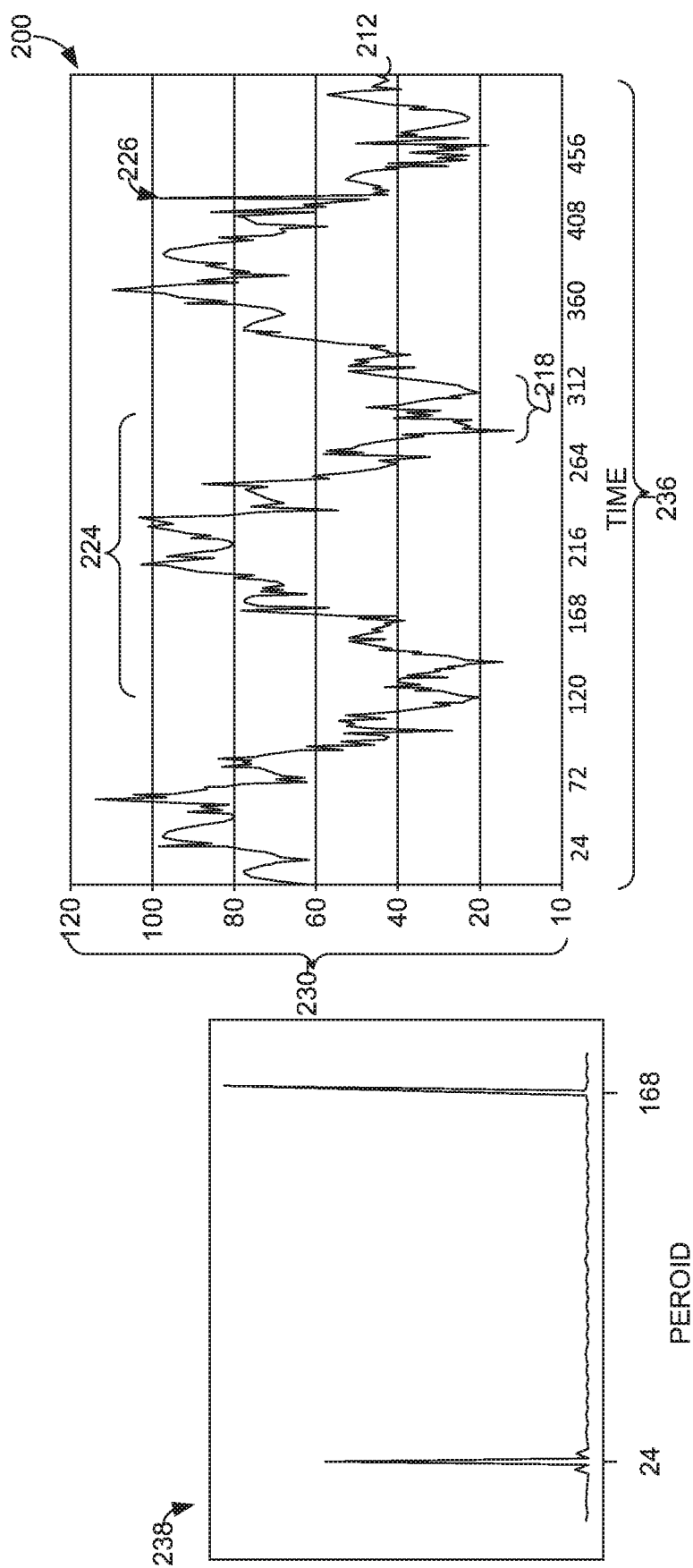
FIG. 2A shows a graph of an example of time series data exhibiting two prominent seasonal periods.
Figure 2B:
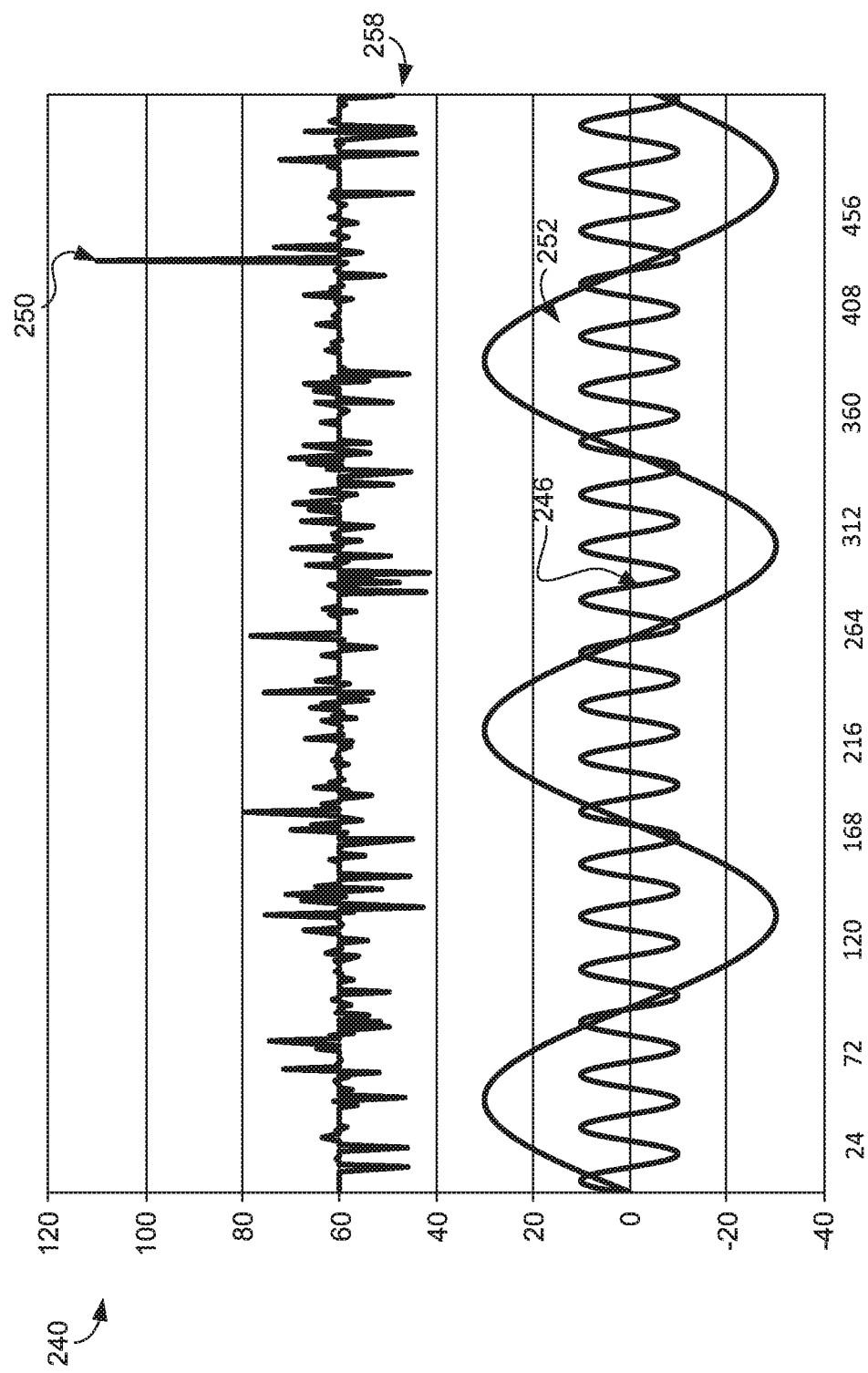
FIG. 2B shows a graph of the time series data of FIG. 2A decomposed into constituent seasonality periods.

Exemplary frequency domain analysis of time series data that can be performed by frequency domain analyzer 114 is described with respect to FIGS. 1, 2A, and 2B. FIG. 2A shows a graph of an example of a time series exhibiting two dominant seasonality periods. Graph 200 shows time series 212, which represents a histogram of inputs 230 over a series of time intervals 236. Inputs 230 can represent any measurable quantity. For example, inputs 230 can represent the number of visitors to a website. Time intervals 236 can represent any unit of time. In some implementations, each time interval 236 can represent one hour.

Time series 212 exhibits two prominent seasonal patterns, a daily seasonality 218, having a period of 24 hours, and a weekly seasonality 224, having a period of 168 hours. Though time series 212 only displays two seasonal patterns, this is only for exemplary purposes. For example, data can vary on daily, 24-hour cycles, weekly cycles (e.g. repeating every 168 hours) or even monthly or annual cycles. Time series 212 further includes anomaly 226, however the daily seasonal period 218 and weekly seasonal period 224 each contribute to obscuring anomaly 226.

Graph 238 is a periodogram representing the seasonality of the time series data. Though a periodogram typically is generated in the frequency domain, for the sake of clarity, graph 238 is depicted in terms of period. Graph 238 exhibits two large amplitudes, corresponding to a period of 24 hours and a period of 168 hours. These amplitudes correlate to seasonal periods 218 and 224, respectively.

FIG. 2B shows graph 240 of the time series 212 of FIG. 2A decomposed into constituent seasonal periods. Graph 240 is presented to demonstrate how removal of seasonal patterns from time series data, such as by filtering as disclosed in aspects for this disclosure, can simplify anomaly detection. Graph 240 shows daily periodic component 246, which corresponds to a daily seasonality 218, and a weekly period component 252, which corresponds to weekly seasonality 224 separated and distinguished from baseline component 258. Baseline component 258 includes the random variations in the time series data as well as anomaly 250, which corresponds to anomaly 226. The difference in magnitude between anomaly 250 is much easier to detect in baseline 258 and can be the basis for the anomaly detection component triggering an alert.

For the sake of clarity, graph 240 represents an idealized form, with baseline 258 shown as substantially flat other than anomaly 250 and the random variations. However in some implementation, time series 212 shown in FIG. 2A cannot be decomposed to a flat baseline 258. Further, in some embodiments it may be desirable to not filter out all prominent seasonal patterns exhibited by the time series data.

In accordance with some implementations of the present disclosure, hashing processor 116 is configured to hash the frequencies of the periodogram. As it is used here, hashing can be defined as a process of mapping different frequencies corresponding to fractional time intervals to a nearest whole number seasonality. For example, frequencies corresponding to a 1.8 hour seasonal period, a 2.0 hour seasonal period, and a 2.3 hour seasonal period can all be combined and mapped to the 2.0 hour period. In general, frequency domain analyzer 114 can decompose time series data into frequency components of any frequency, including frequencies which do not correspond to period of whole number time intervals.

Figure 3A:
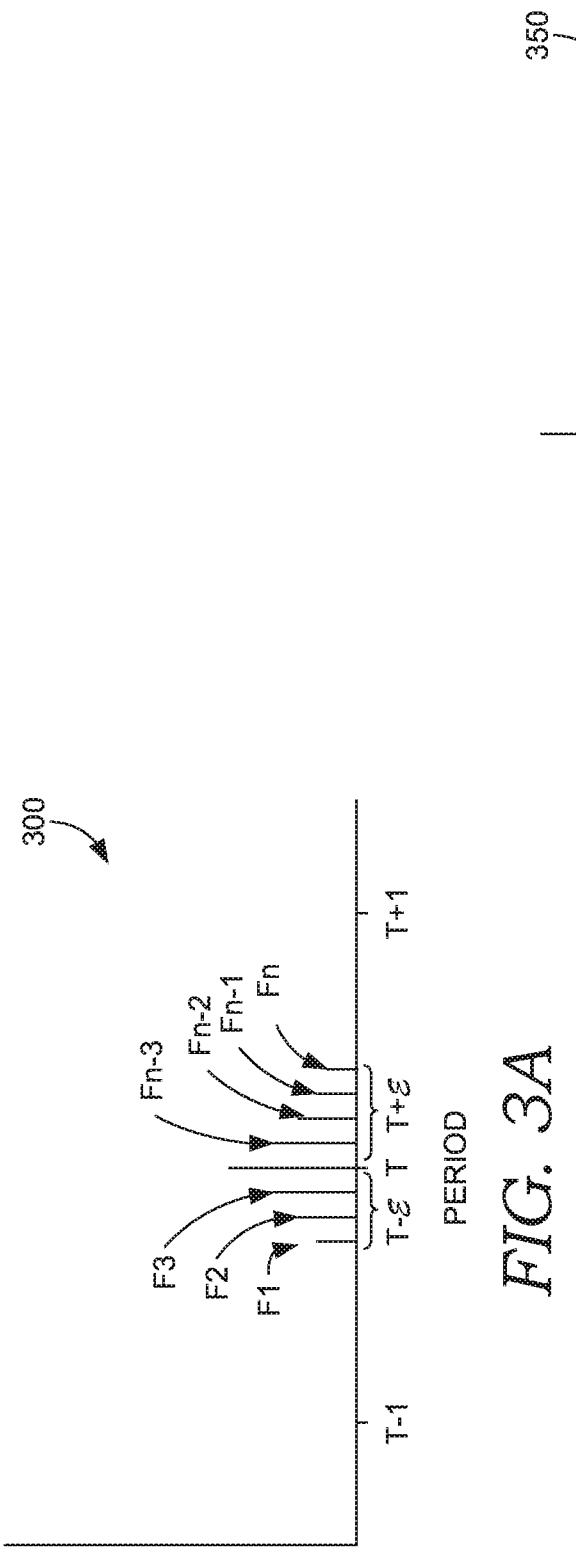
FIG. 3A shows a graph of a periodogram with multiple frequency amplitudes prior to hashing.
Figure 3B:
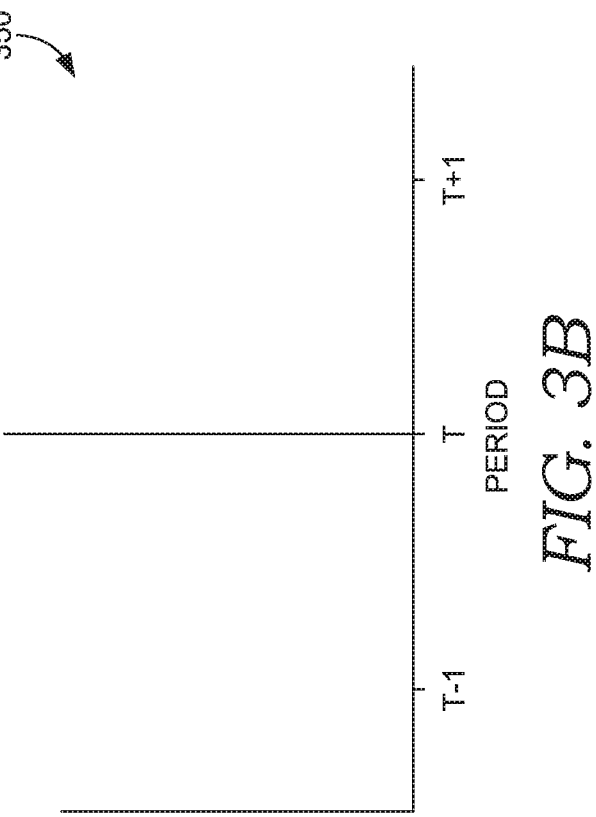
FIG. 3B shows a graph of the periodogram of FIG. 3A with the multiple frequencies hashed to a common hashed frequency.

Exemplary hashing of time series data that can be performed by hashing processor 116 is described with respect to FIGS. 1, 3A, and 3B. FIG. 3A shows a graph 300 of a set of amplitudes in the frequency domain. Frequencies T, T-1, and T+1 each correspond to periods of whole number time intervals. For example, T-1 can correspond to a season of 2 hours, T can correspond to a season of 3 hours, and T+1 can correspond to a season of 4 hours. Frequency T is surrounded by frequencies F1 through Fn. Frequencies F1 through Fn can be called fractional frequencies, as the periods corresponding to these frequencies are not whole number time intervals. After the hashing frequency T can be called the hashed frequency.

The amplitudes of the periodogram corresponds the power that each frequency contributes to the seasonality of the time series data; the power function of a given frequency being represented as $power_{frequency}(f)$. Due to the sample size and the granularity of the historic time series data, some amount of leakage from frequency T into surrounding frequencies is to be expected. The hashing is performed as follows to determine the power at a particular season T:

$$power_{season}(T) \Sigma_{\forall f:(T-\epsilon) \leq f \leq (T+\epsilon)} power_{frequency}(f)$$

Where $\epsilon$ is the round-off boundary for the seasons. For example, a season of 2 hours and a series of 3 hours would correspond to a frequency of 0.5 and 0.3333, respectively. The round-off boundary between these frequencies may be set at 0.4, which corresponds to a period of 2.5 hours.

FIG. 3B shows a graph 350 similar to graph 300 of FIG. 3A wherein the hashing process have been applied. The F1 through Fn of FIG. 3A have been aggregated with and mapped to frequency T. In other words, the combined amplitudes of F1 through Fn can be seen at the hashed frequency T. After the hashing processor 116 aggregates and maps the fractional frequencies to the hashed frequency, the amplitudes of the frequencies can be ranked and the frequencies having the highest amplitudes can be identified as prominent seasonal elements.

Filtering component 118 generates a filter to dampen or remove frequencies corresponding to one or more prominent seasonal elements. Filters can take various forms, including low pass filters, high pass filters, stopband filters, and band-pass filters (a filter can be implemented as a Chebyshev, a Notch, a Butterworth, or other type of filter). In some implementations, a stopband filter can be used. The stopband frequencies are identified as the frequency corresponding to the higher seasonality elements and are removed. In other implementations, a band-pass filter can be used, in which case the pass band frequencies may be identified as frequencies corresponding to the higher seasonality. The input time series is filtered to isolate these bands and the resulting components are removed from the input. Seasonality filters 134 so generated can be stored in anomaly detection system 106 for later use with future time series data.

In some implementations, it may be desirable to filter out only a portion of the prominent seasonal components detected by the frequency domain analyzer 114. For example, anomaly detection system 106 can be designed to assume a seasonal element as part of the predictive model. Completely eliminating all seasonal components from the time series data may not improve the efficiency or accuracy of such predictive models, as the model can calculate parameters for a seasonal component whether or not such a seasonal component is present in the time series data. In such cases, the filtered time series data can be left to still exhibit some of the seasonality of the unfiltered data.

In some implementations, frequency domain analyzer 114 can establish a threshold frequency such that only frequencies lower than (e.g. frequencies corresponding to longer seasonal periods) the threshold frequency are considered as among the prominent seasonal components, while disregarding higher frequencies (e.g. frequencies corresponding to shorter seasonal periods). In some implementations, the threshold frequency may be a predefined value and may, for example, be determined by a specified seasonal period for a predictive model. In other implementations, the threshold frequency may be calculated, for instance, to optimize accuracy and efficiency of the system. This can allow the lower frequency seasonal components to be identified in order for filtering component 118 to tune the seasonality filter 134 to remove those low frequency seasonal components, while leaving any higher frequency patterns in be incorporated in the predictive model.

Figure 2C:
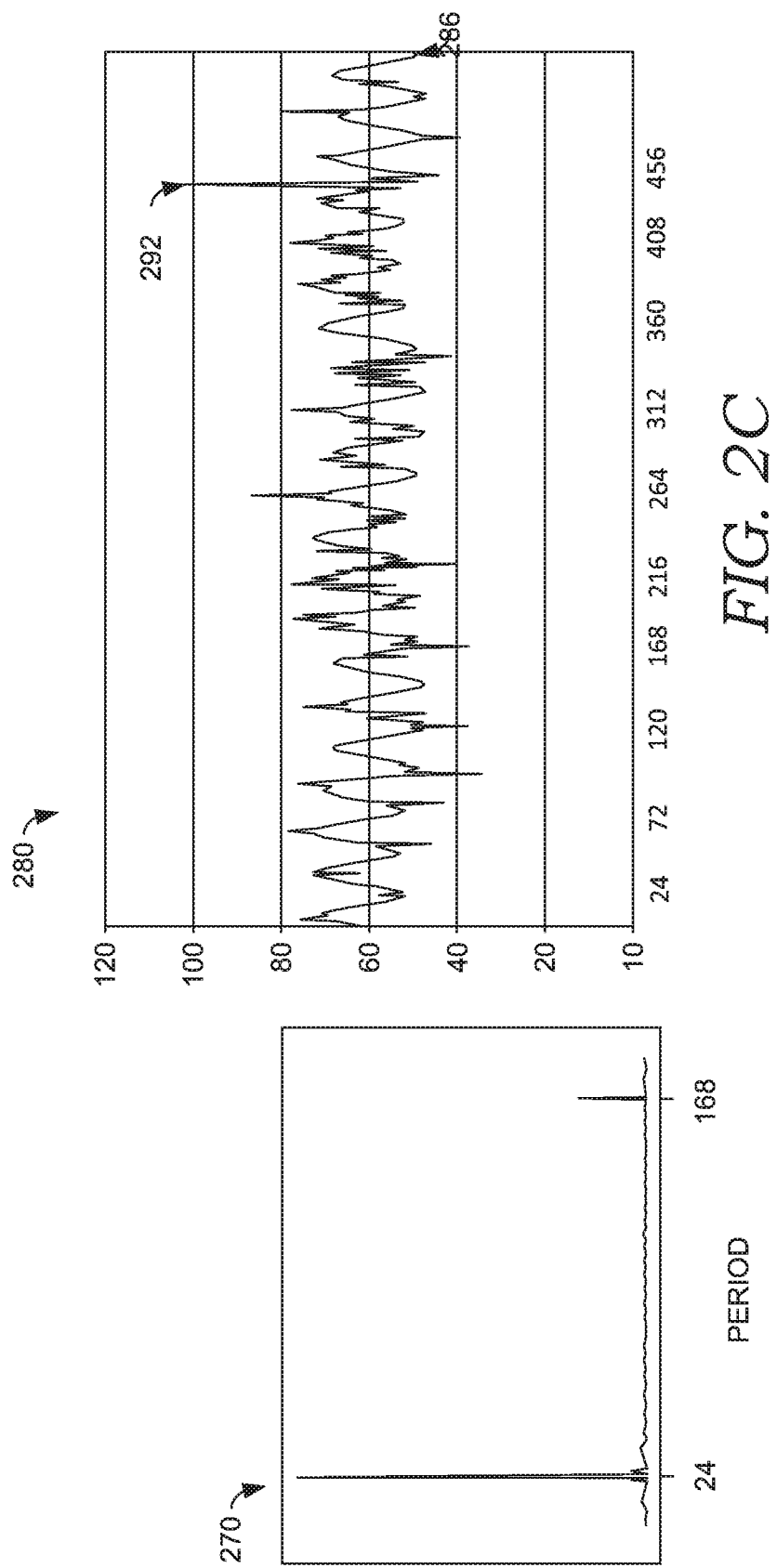
FIG. 2C shows a graph of the time series of FIG. 2A after the higher prominent seasonality has been filtered out.

FIG. 2C shows graph 280 of time series 286. Time series 286 is comparable to time series 212 of FIG. 2A, however the seasonal component corresponding to the 168 hour seasonal period 224 has been filtered out by filtering component 118. Whereas FIG. 2B depicts a fully deconstructed time series, FIG. 2C depicts a filtered time series where only selected frequencies are filtered out. As discussed above, this selective filtering may be as a result of a threshold frequency being set such that, for example, seasonal components having a period of 24 hours or shorter would not be considered as part of the prominent seasonal pattern for filtering. Graph 270 shows the periodogram for the resulting filtered time series. As a result of the filtering, anomaly 292 is more easily distinguished from the natural variations in the time series 286.

Predictive modeling component 120 generates a predictive model is trained with historic time series data. The predictive model can then be used to predictive future values of a metric as a function of time. Exemplary training of a predictive model and use of the trained predictive model is described below. Assume, for example, that for historic time series data containing t time intervals, that $y_1, y_2, \ldots y_t$ are the values of a metric observed in each time interval 1 through t. The value m is the seasonal time period. This is conventionally an input from the user, however, seasonality information from the frequency domain analyzer 114 can be provided to predictive modeling component 120 to set the seasonal time period, m.

In some implementations, the system can fit historic time series data to a triple exponential smoothing model. For a given time interval t and a future time interval t+1, the predicted value for the metric in the next time interval $yp_{t+1}$ using a triple exponential smoothing model can be the sum of three components: level, growth, and season.

$$yp_{t+1} = l_t + b_t + s_{t-m+1}$$

The equations for these three components are as follows:

Level: $l_t = \alpha*(y_t - s_{t-m}) + (1-\alpha)*(l_{t-1} + b_{t-1})$

Growth: $b_t = \beta*(l_t - l_{t-1}) + (1-\beta)*b_{t-1}$

Season: $s_t = \gamma*(y_t - l_{t-1} - b_{t-1}) + (1-\gamma)*s_{t-m}$

A separate seasonal value $s_t$ must be estimated for each time interval in the seasonal time period m. Training the model required the parameters $\alpha$, $\beta$, $\gamma$, $l_0$, $b_0$, $s_{-m}$, ..., $s_0$ to be estimated. In some embodiments, these parameters can be estimated using the maximum likelihood estimation approach. In some implementations, each parameter can carry with it a confidence interval, such that the predictive model can generate an expected range for the metric within the next time interval $yp_{t+1}$. Predictive models 136 can be generated by predictive modeling component 120 using this approach and can be stored in the anomaly detection system 106 for later use.

As additional time series data is received into the anomaly detection system 106 through the interface engine 112, filtering component 118 can apply one or more of seasonality filters 134 to this new data to produce a set of filtered measurements. Predictive modeling component 120 can execute predictive model 136 to produce an expected range for the metric values. The predictive modeling component 120 can compare the filtered time series data to these expected ranges in order to detect anomalies by identifying deviations from the expected ranges.

In some implementations, predictive modeling component 120 adds the filtered measurements to historic time series data 132 of FIG. 1, to incrementally updated predictive model 136 as necessary to fit to the new data. In some implementations, anomalies in the filtered measurements can be modified before being added to historic time series data 132 so as to avoid skewing later results. For example, an anomaly in the filtered measurements that is higher than the expected range can be assigned the highest value within the expected range prior to being added to historic time series data 132.

In the event that a value in the filtered measurements is found to fall outside of the expected range, interface engine 112 can generate an alert to send to any of user devices 102a-102n. Alerts can take the form of an email, an SMS text message, a MMS text message, a push notification, or any similar electronic communication. In some implementations, interface engine 112 provides application 110 with a graphical representation of the comparison of measured metrics and the expected values of the predictive model.

Figure 4:
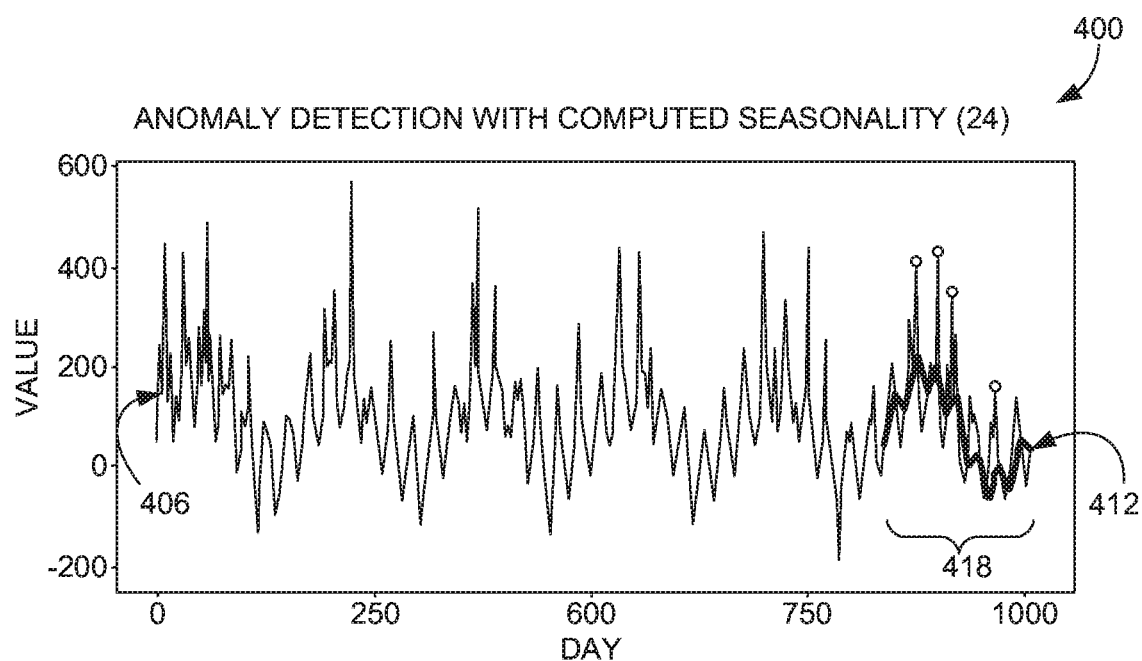
FIG. 4 shows a graph of an anomaly detection prediction applied to the filtered time series data.

Exemplary display graphics of observed metrics overlaid with expected values generated by the predictive model is described with respect to FIGS. 1 and 4. FIG. 4 shows a graph 400 of a set of measured metric values 406 wherein the expected values 412 generated by predictive model 136 have been overlaid on the filtered measurements observed over the time period 418. Graph 400 depicts time series data for which the higher (e.g. weekly) seasonality has been filtered out. In some implementations, it may be desirable to render a graph similar to graph 400 wherein the seasonality is depicted. Filtering component 118 can use seasonality filter 134 to reconstitute the higher seasonality components removed from the original signal data to produce a superposition of the higher seasonality components on the filtered measurements 406 and expected values 412. Interface engine 112 can send the superposition to be displayed on a user device.

Figure 5:
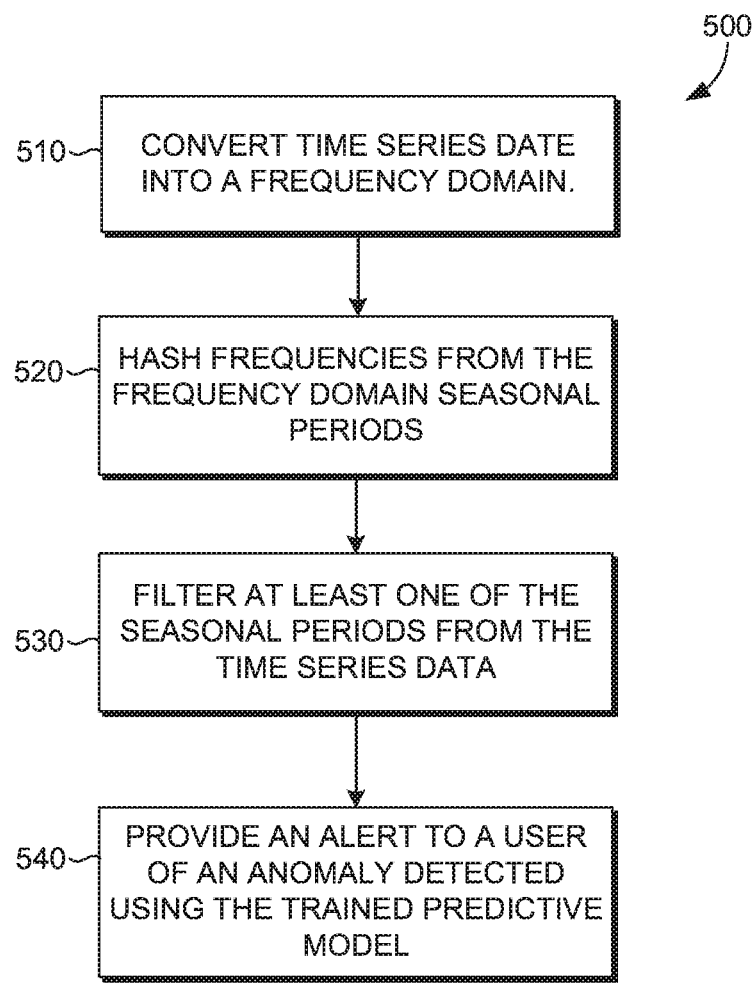
FIG. 5 is a flow diagram showing a method for detecting anomalies in time series data in accordance with embodiments of the present disclosure.

With reference to FIG. 5, a flow diagram is provided showing an embodiment of a method 500 for detecting anomalies in times series data. At block 510, method 500 includes extracting a periodogram representing the frequency domain of the historic time series data. For example, one or more applications on any combination of user devices 102a through 102n (or another device) can be used to provide time series data to anomaly detection system 106 containing at least one metric of interest to a user. Anomaly detection system 106 can store the time series data as historic time series data 132. Frequency domain analyzer 114 can generate a representation of historic time series data 132 as a periodogram.

At block 520, method 500 includes hashing frequencies to discrete seasonal periods and ranking the frequencies by power. For example, hashing processor 116 can aggregate the amplitudes of frequencies F1 through Fn together and map the aggregate amplitude to frequency T.

At block 530, method 500 includes generating a seasonality filter tuned to higher seasonal elements and applying the seasonality filter to the historic time series data to remove higher seasonal elements. For example, filtering component 118 determines whether there is any prominent seasonality with frequencies less than the threshold frequency and generates a seasonality filter to remove the corresponding frequencies. Filtering component 118 can apply the seasonality filter to the historic time series data to generate a set of filtered data. Seasonality filters 134 generated in this way can be stored in anomaly detection system 106 for later use.

At block 540, method 500 includes training a predictive model using the filtered data. For example, predictive modeling component 120 can estimate a set of parameters to fit the model to the filtered historic time series data. Predictive models 136 generated by the predictive modeling component can be stored in the anomaly detection system 106 for later use.

Figure 6:
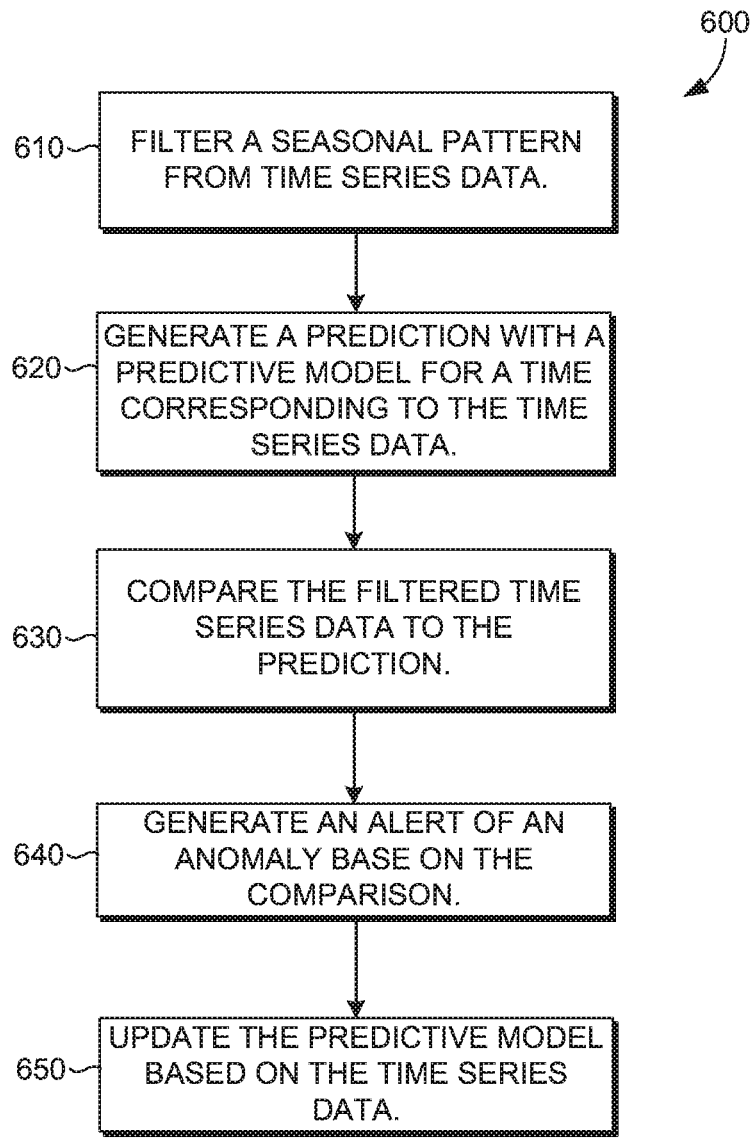
FIG. 6 is a flow diagram showing a method for detecting anomalies in time series data in accordance with embodiments of the present disclosure.

With reference to FIG. 6, a flow diagram is provided showing an embodiment of a method 600 for detecting anomalies in time series data. At block 610, method 600 includes applying a stored seasonality filter to the new observation of a metric. For example, filtering component 118 can retrieve stored seasonality filter 134 and apply the filter to newly received metrics readings.

At block 620, method 600 includes generating predictions from the predictive model for the time period corresponding to the new observation of the metric. For example, predictive modeling component 120 can retrieve stored predictive model 136 and execute the model for the time period corresponding to the new observations.

At block 630, method 600 includes comparing filtered observations to the predictions generated in block 620. For example, the observed metrics can be compared to the expected results generated by the predictive model. If the observed values fall outside of the range that the predictive model anticipated, predictive modeling component 120 can identify the event as an anomaly.

At block 640, method 600 includes automatically generating an alert of the occurrence of an anomaly. For example, interface engine 112 can send a message to any one or more of user devices 102a through 102n reporting the occurrence of the anomaly.

In some embodiments, at block 650, method 600 includes iteratively updating the predictive model. The observed measures can be anomaly detection system 106 and can be processed as time series data by method 500.

Figure 7:
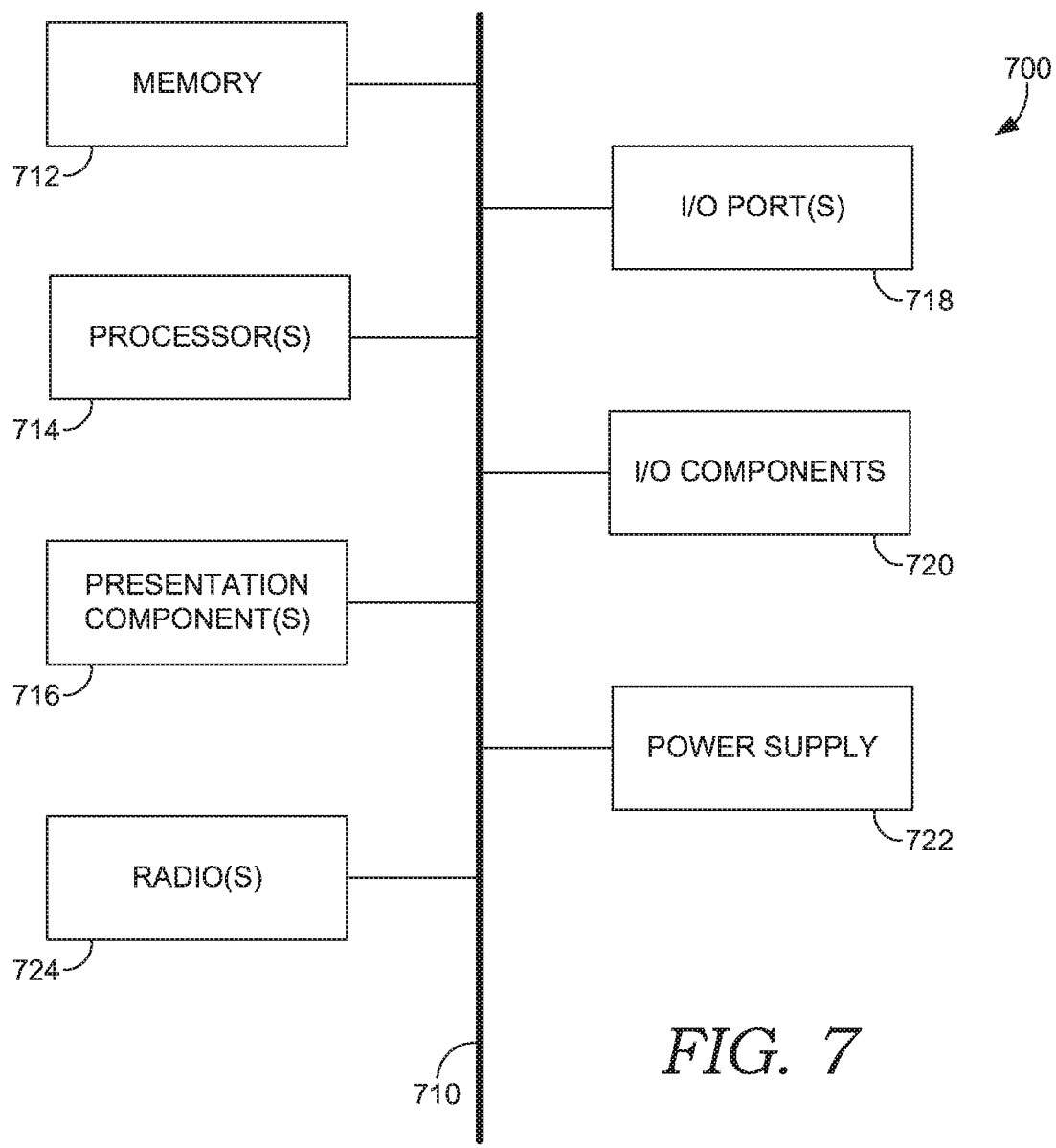
FIG. 7 is a block diagram of an exemplary computing environment suitable for use in implementations of the present disclosure.

With reference to FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art and reiterate that the diagram of FIG. 7 is merely illustrative of an exemplary computing device that can be used in connection with one or more embodiments of the present invention. Distinction is not made between such categories as "workstation," "server," "laptop," "handheld device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 712 includes computer-storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

As can be understood, implementations of the present disclosure provide for detecting anomalies in time series data. The present invention has been described in relation to particular embodiments, which are intended in all respects to be illustrative rather than restrictive. Alternative embodiments will become apparent to those of ordinary skill in the art to which the present invention pertains without departing from its scope.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computer-implemented system comprising:
   at least one processor; and
   at least one computer-readable media having a plurality of executable instructions embodied thereon, which, when executed by the at least one processor causes the at least one processor to perform a method comprising:
   receiving a first set of time series data representing a time series corresponding to a metric;
   identifying frequencies of seasonal patterns from the first set of time series data, each frequency representing a seasonal pattern of periodic oscillations of values of the time series;
   selecting, from the seasonal patterns, a group of seasonal patterns as prominent seasonal patterns, each seasonal pattern of the group being selected based at least on the frequency of the seasonal pattern exceeding a threshold frequency and a ranking of magnitudes of amplitudes of the frequencies, wherein each amplitude of the amplitudes comprises a measure of a contribution of a frequency to seasonality of the time series relative to others of the frequencies;
   filtering the first set of time series data, the filtering removing the prominent seasonal patterns from the first set of time series data based at least on the selecting of the prominent seasonal patterns;

generating a predictive model from the filtered first set of time series data using a seasonal period that corresponds to the threshold frequency;

filtering a second set of time series data, the filtering removing the prominent seasonal patterns from the second set of time series data, the second set of time series data corresponding to the metric;

comparing the filtered second set of time series data to the predictive model; and providing an alert to a user based on the comparing indicating the filtered second set of time series data deviates from the predictive model.

2. The computer-implemented system of claim 1, wherein the filtering of the prominent seasonal patterns from the first set of time series data comprises applying a seasonality filter to the first set of time series data and the filtering the prominent seasonal patterns from the second set of time series data comprises applying the seasonality filter to the second set of time series data.

3. The computer-implemented system of claim 1, further comprising generating a set of expected ranges of the metric from the predictive model, wherein the comparing is of the filtered second set of time series data to the set of expected ranges.

4. The computer-implemented system of claim 1, wherein the selecting includes selecting a first seasonal pattern based on determining a first amplitude of a first frequency of the first seasonal pattern is larger than a second amplitude of a second frequency of the frequencies.

5. The computer-implemented system of claim 1, further comprising:
identifying a first frequency and a second frequency from the frequencies;
determining the second frequency corresponds to a frequency leakage from the first frequency;
based on the determining combining an amplitude of the first frequency with an amplitude of the second frequency resulting in a combined amplitude of the amplitudes; and
assigning the combined amplitude to the first frequency.

6. The computer-implemented system of claim 1, wherein a quantity of parameters of the predictive model are based at least on the seasonal period.

7. The computer-implemented system of claim 1, wherein the alert comprises an electronic communication and the providing is of the electronic communication to a user device.

8. The computer-implemented system of claim 1, wherein the metric measures activities of a computer network-site.

9. A computer-implemented method comprising:
receiving a first set of time series data representing a time series corresponding to a metric;
identifying frequencies of seasonal patterns from the first set of time series data, each frequency representing a seasonal pattern of periodic oscillations of values of the time series;
selecting, from the seasonal patterns, a group of seasonal patterns as prominent seasonal patterns, each seasonal pattern of the group being selected based at least on the frequency of the seasonal pattern exceeding a threshold frequency and a ranking of magnitudes of amplitudes of the frequencies, wherein each amplitude of the amplitudes comprises a measure of a contribution of a frequency to seasonality of the time series relative to others of the frequencies;
filtering the first set of time series data, the filtering removing the prominent seasonal patterns from the first set of time series data based at least on the selecting of the prominent seasonal patterns;
determining parameters of a predictive model based on the filtered first set of time series data, the parameters defining predicted future values of the metric as a function of time and a quantity of the parameters being based at least on a seasonal period that corresponds to the threshold frequency;
filtering a second set of time series data, the filtering removing the prominent seasonal patterns from the second set of time series data based at least on the selecting of the prominent seasonal patterns, the second set of time series data corresponding to the metric;
generating at least one of the predicted future values from the predictive model based on a future time that corresponds to the filtered second set of time series data;
identifying a deviation between the at least one of the predicted future values and the filtered second set of time series data; and
providing an alert to a user device based on the identified deviation.

10. The computer-implemented method of claim 9, wherein the determining parameters of the predictive model comprises:
updating prior parameters of the existing predictive model based on the filtered first set of time series data.

11. The computer-implemented method of claim 9, further comprising:
determining a portion of the filtered first set of time series data conforms to the predicted future values; and
based on the determining updating the parameters of the predictive model based on the portion of the filtered first set of time series data.

12. The computer-implemented method of claim 9, wherein the parameters of the predictive model further define expected ranges for the predicted future values of the filtered first set of time series data as a function of time, and
wherein the identifying the deviation between the at least one of the predicted future values and the filtered second set of time series data comprises:
determining that at least one value of the filtered second set of time series data falls outside of the expected range, the at least one value corresponding to the future time.

13. The computer-implemented method of claim 9, further comprising:
determining a portion of the filtered second set of time series data that corresponds to the identified deviations;
replacing at least one value of the portion of the second set of filtered time series data that corresponds to the deviation with at least one corrected value that is within an expected range of the predicted future values; and
updating the parameters of the predictive model based on the second set of filtered time series data that includes the at least one corrected value.

14. The computer-implemented method of claim 9, wherein the filtering removes from the first time series data each of the prominent seasonal patterns that has a lower frequency than the threshold frequency.

15. The computer-implemented method of claim 9, wherein the predicted future values of the metric are defined in the predictive model using time intervals.

16. The computer-implemented method of claim 9, wherein the alert comprises a push notification and the providing is of the push notification for display on the user device.

17. At least one non-transitory computer-readable media having a plurality of executable instructions embodied thereon, which, when executed by one or more processors, cause the one or more processors to perform a method comprising:
- receiving a first sequence of time series data representing a time series in a stream of the time series data that is associated with a user;
- identifying frequencies from a spectral density estimation of the first set of time series data;
- generating common frequencies of seasonal patterns and aggregated amplitudes from sets of the frequencies, each common frequency representing a seasonal pattern of periodic oscillations of values of the time series, the generating comprising for each set of the sets of the frequencies, mapping the frequencies of the set to a common frequency of the common frequencies, and based on the mapping, combining amplitudes of the frequencies of the set to form an aggregated amplitude of the aggregated amplitudes, wherein each amplitude of the aggregated amplitudes comprises a measure of a contribution of a common frequency to seasonality of the time series relative to others of the common frequencies;
- selecting, from the seasonal patterns, a group of seasonal patterns as prominent seasonal patterns, each seasonal pattern of the group being selected based at least on the common frequency of the seasonal pattern exceeding a threshold frequency and a ranking of magnitudes of the aggregated amplitudes of the common frequencies;
- filtering the first set of time series data, the filtering removing the prominent seasonal patterns from the first sequence of time series data based on the selecting of the prominent seasonal patterns;
- generating a predictive model from the filtered first sequence of the time series data using a seasonal period that corresponds to the threshold frequency;
- receiving a second sequence of the time series data that follows the first sequence of the time series data in the stream;
- detecting that a value in the second sequence the time series data falls outside of an expected range of the value predicted by the predictive model; and
- transmitting an alert to the user based on the detecting of the value.

18. The non-transitory computer-readable media of claim 17, wherein a quantity of parameters of the predictive model is based on the seasonal period.

19. The non-transitory computer-readable media of claim 17, wherein the mapping for each set of the sets of the frequencies is to a nearest whole number period.

20. The non-transitory computer-readable media of claim 17, wherein the filtering removes from the first sequence of time series data each of the prominent seasonal patterns that has a lower frequency than the threshold frequency.

* * * * *